Nov. 13, 1962     K. C. McLENNAN     3,064,067
LAYER TYPE VOLTAIC CELLS
Filed Jan. 7, 1959
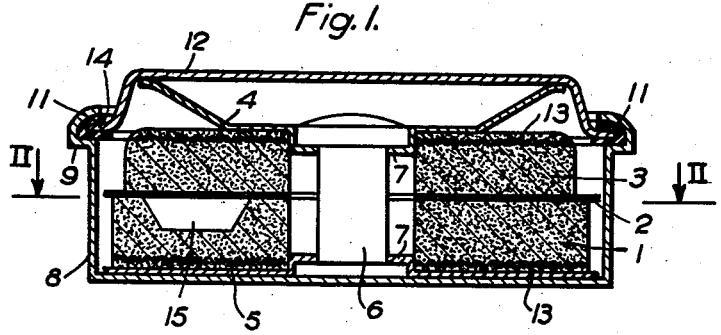
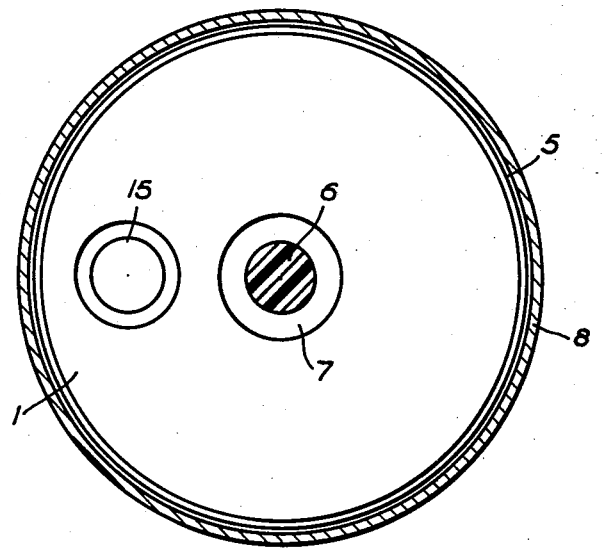
INVENTOR
Kenneth Charles McLennan
ATTORNEY

United States Patent Office 3,064,067
Patented Nov. 13, 1962

3,064,067
LAYER TYPE VOLTAIC CELLS
Kenneth C. McLennan, Monifieth, Angus, Dundee, Scotland, assignor to Burndept Limited, London, England, a corporation of Great Britain
Filed Jan. 7, 1959, Ser. No. 785,533
Claims priority, application Great Britain Jan. 10, 1958
6 Claims. (Cl. 136—111)

This invention relates to an improved construction of voltaic cell of the layer type and a method of making it. The purpose is to render the cell immune from disturbance by gas pressure or other mechanical forces arising in the formation or use of the cell, to widen tolerances in manufacture, and to achieve precision in the supply of electrolyte. The invention is particularly applicable to very small cells, such as those sometimes known as button type, in which the above desiderata are especially important and at present not readily obtained.

With these purposes in view a principal object of the invention is an assembly of active cell components between protecting inactive metal end plates, firmly held in good electrical contact with each other and said plates by an insulating rivet passing through the whole assembly forming an assembly that can be freely handled for impregnation and subsequent enclosure.

Yet another object of the invention is a hermetically sealed voltaic cell in which maintenance of electrical contact between the cell components is independent of the pressure of the cell casing upon them so that close tolerance in the dimensions of the component assembly and of the cell container is not called for.

A further specific object of the invention is a hermetically sealed cell wherein an assembly of active components is maintained in electrical contact irrespectively of tolerance in the two-part cell casing and is held under spring pressure between the parts of the casing which are secured to one another mechanically and insulated from each other electrically.

The invention also includes methods of cell manufacture by which these objects may be attained.

Yet other objects of the invention will appear from the description following of an example of a cell embodying the invention.

The invention is applicable to secondary as well as primary batteries, and is here illustrated by its embodiment in a secondary cell of the type in which the active anode and cathode materials are formed within the interstices of bodies of sintered metal. Such a cell is shown diagrammatically in FIG. 1 in axial section; in FIG. 2 in section on the line II—II of FIG. 1.

As already explained the invention is especially of value in the making of small cells; that illustrated might, for example, be about two centimetres in diameter and half a centimetre thick. These dimensions, and particularly the thicknesses of the several elements, are much exaggerated in the drawing for the sake of clearness, and therefore the drawing may not be taken as an accurate guide to dimensions or relative dimensions.

The active components of the cell are an anode 1, a separator and electrolyte holder 2, and a cathode 3.

Both anode and cathode are formed on a base of sintered metal. For example nickel powder of uniform grain size is sifted into a graphite mould, which is closed by a graphite cover and transferred without shaking to a sintering oven, where the metal is sintered in an inert or reducing atmosphere at a temperature of about 900° C. In the case of very thin electrodes it is desirable to provide reinforcement by embedding a thin metal gauze in the powder prior to sintering. The two sintered plaques for a cell are rendered active in known manner. For example the positive electrode may be impregnated by immersing it in an aqueous solution of the nitrate or other soluble salt of nickel, reducing the ambient pressure to 10 to 20 mm. of mercury for five minutes, and restoring atmospheric pressure for a further five minutes; the impregnated plaque is then made the cathode in a boiling bath of 25% caustic potash solution, a voltage sufficient to produce a current of 1.0 ampere per square inch being applied before the plaque is immersed; this treatment is repeated, say, five times, to build up a sufficient active surface on the electrode. The negative electrode is built in the same fashion, using a cadmium salt for impregnation. The finished electrodes are immersed in a 25 to 35% solution of caustic potash and fully charged. They are then removed, washed free of alkali and dried at 60° C. after which they can be stored in dry air for a long time.

The separator 2 may serve two purposes; it prevents contact between the electrodes, and being of necessity porous it will hold a certain amount of electrolyte. It may be made of filter paper, or of porous plastic or both.

The method by which an electrode assembly is made according to the invention is to perforate these active components of a cell, to assemble them with the perforations in register between two stiff metal plates 4, 5, and to secure the plates together by rivetting. For so small a cell as above suggested—2 cm. in diameter—a single central rivet 6 suffices. The rivet must necessarily be insulated so that it does not make electrical connection between the plates 4 and 5, and because the cell is small the rivet is made wholly of insulating material, for example of a polystyrene plastic, the head being formed by a heated flat encased tool.

The metal plates 4, 5, together with the electrodes 1, 3 must be stiff enough to distribute the pressure of the rivet over the whole area of the cell. Since the electrodes have some mechanical strength it is not enssential that the metal plates should extend over the whole area of the electrodes; and this makes possible a further development of the invention mentioned below. Initially the metal plates may be flat; they are shown as formed with central bosses 7 which enter the holes in the electrodes and so position the plates with respect to the electrodes.

This assembly of electrodes is quite robust and can be handled without fear of damage. Electrolyte is added by vacuum impregnation. The amount of electrolyte which will be contained in the cell is therefore precisely what its components can absorb in this process; and is made adequate for the intended life of the cell by the inclusion of sufficient bibulous material in the separator 2.

The assembly now constitutes an active unit capable of yielding current from the plates 4 and 5 which form its terminals; to prevent the electrolyte drying up the assembly must be hermetically enclosed. For this purpose the assembled and impregnated components 1, 2, 3 gripped between the rivetted clamping plates 4, 5 are placed in a casing cup 8 of steel, preferably nickel-plated, and preferably formed with a shoulder 9 so that the mouth of the cup is larger than the lower part. Upon the shoulder is placed a sealing grommet 11 of L section, made of plastic insulation, for example the chloroprene polymer sold under the trade name neoprene. The casing is completed by a cap of steel 12, preferably nickel-plated, formed with a coned periphery and a lip 14 which seats upon the neoprene seal 11. The lip of the cup 8 is spun or swaged inward over the lip of the cap to secure the two together.

Since the clamped cell components cannot readily be made and maintained a tight fit in the casing, there is included with them a leaf or plate spring, which supplements the tension of the rivet 6 and also ensures good electrical connection between the clamping plates 4, 5 and the cup 8 and cap 12 which form the cell terminals.

Where the electrolyte is caustic alkali it is desirable that the surfaces of the cell which are likely to come into contact with the electrolyte should be of magnesium. This may be achieved either by constructing the entire cell container of magnesium or by suitably coating a different base material with magnesium. The purpose served by the magnesium is to render creepage of the electrolyte along the metal surface more difficult.

As above explained if the electrodes 1 and 3 are required to be very thin one or both may be re-inforced by metal gauze as indicated at 13.

Where, as above described, the electrodes are formed in bodies of sintered metal, contact between an electrode and the clamping plate next to it may be improved by spot welding the two together. For this purpose the sintered metal should first be consolidated by pressure of a blunt tapered tool forming a depression 15 where welding is to be done, as shown for the positive electrode only in the drawings.

Since, as above explained, it is not necessary that the clamping plates should extend over the whole surface of the electrodes, it is possible to make one of them serve also as a spring. This is shown in FIG. 1 by the plate 4 being made of dished form. The plate may, for example, be a square washer with its corners bent upward.

I claim:

1. A dry cell comprising an electrode assembly including two clamping plates, active components, namely an anode, a separator and a cathode assembled in that order between said clamping plates, an insulated rivet of insulating material passing through said clamping plates and active components securing the plates together and maintaining the active components under contact-making pressure, a two part metal casing hermetically enclosing said clamping plates and active components, its two parts being mechanically engaged the one with the other, an insulating layer separating the two parts electrically, and spring means exerting pressure between said casing and said electrode assembly.

2. A dry cell according to claim 1 wherein the electrolyte is caustii alkali and the inner surface of the two-part casing is magnesium.

3. A method of building a dry cell which consists in assembling the active components between stiff metal clamping plates, riveting the plates together by an insulating rivet, impregnating the assembly with electrolyte, enclosing the assembly in a two-part metal casing having its parts separated by insulation, and hermetically sealing said casing by mechanically engaging its parts together while these are exerting resilient pressure upon the assembly in the casing.

4. A method of making for dry cells an assembly of active components which can be handled, which consists in activating an anode and cathode of sintered metal, locally consolidating at least one of said electrodes and spot welding the consolidated part to a clamping plate, assembling said electrodes with a separator between them between clamping plates, and riveting said clamping plates together an insulating rivet passing through the whole assembly.

5. A dry cell comprising an electrode assembly including two clamping plates, active components, namely an anode, a separator and a cathode assembled in that order between said clamping plates, and insulated rivet passing through said clamping plates and active components securing the plates together and maintaining the active components under contact-making pressure, a two part metal casing hermetically enclosing said clamping plates and active components, its two parts being mechanically engaged the one with the other and presenting flat surfaces spaced apart by the full depth of the cell and constituting the cell terminals, an insulating layer separating the two parts electrically, and spring means exerting pressure between said casing and said electrode assembly.

6. An electrode assembly for a dry cell comprising two flat electrode bodies of sintered metal with active material contained in their pores, a porous separator between said electrodes, stiff metal clamping plates one on each side of said electrode bodies and separator, and a plastic rivet securing said clamping plates together, at least one sintered metal electrode body being locally consolidated and there welded to the adjacent clamping plate.

References Cited in the file of this patent

UNITED STATES PATENTS

| | | |
|---|---|---|
| 1,468,574 | Parker | Sept. 18, 1923 |
| 2,491,640 | Blake et al. | Dec. 20, 1949 |
| 2,582,973 | Ellis | Jan. 22, 1952 |
| 2,601,267 | Ellis | June 24, 1952 |
| 2,689,876 | Lehavec | Sept. 21, 1954 |
| 2,837,590 | Rhyne | June 3, 1958 |
| 2,934,580 | Neumann | Apr. 26, 1960 |